(12) United States Patent
Guo et al.

(10) Patent No.: US 12,265,236 B2
(45) Date of Patent: Apr. 1, 2025

(54) OPTICAL MODULE, MANUFACTURING METHOD, AND DISPLAY DEVICE

(71) Applicant: BOE Technology Group Co., Ltd., Beijing (CN)

(72) Inventors: Kang Guo, Beijing (CN); Feng Zhang, Beijing (CN); Haitao Huang, Beijing (CN); Renquan Gu, Beijing (CN); Mengya Song, Beijing (CN); Duohui Li, Beijing (CN); Song Liu, Beijing (CN); Xin Gu, Beijing (CN); Guangcai Yuan, Beijing (CN); Xue Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/637,667

(22) PCT Filed: Apr. 26, 2021

(86) PCT No.: PCT/CN2021/089950
§ 371 (c)(1),
(2) Date: Feb. 23, 2022

(87) PCT Pub. No.: WO2022/226726
PCT Pub. Date: Nov. 3, 2022

(65) Prior Publication Data
US 2024/0045118 A1 Feb. 8, 2024

(51) Int. Cl.
G02B 5/00 (2006.01)
G02B 3/00 (2006.01)
G02B 7/02 (2021.01)
G02B 27/02 (2006.01)
G02B 27/18 (2006.01)

(52) U.S. Cl.
CPC ............ G02B 5/003 (2013.01); G02B 3/005 (2013.01); G02B 7/021 (2013.01); G02B 27/026 (2013.01); G02B 27/18 (2013.01)

(58) Field of Classification Search
CPC ....... G02B 5/003; G02B 3/0056; G02B 27/18
See application file for complete search history.

(56) References Cited

U.S. PATENT DOCUMENTS

2014/0084141 A1 3/2014 Akiyama et al.
2019/0312072 A1 10/2019 Cho et al.

FOREIGN PATENT DOCUMENTS

| CN | 103413495 A | 11/2013 |
|---|---|---|
| CN | 107402453 A | 11/2017 |
| CN | 108563014 A | 9/2018 |

(Continued)

OTHER PUBLICATIONS

CN 202180000917.X first office action dated Oct. 17, 2024.
CN 202180000917.X second office action dated Dec. 28, 2024.

*Primary Examiner* — Ryan D Howard
(74) *Attorney, Agent, or Firm* — IPro, PLLC (57) ABSTRACT

The present disclosure relates to the field of display technology, and provides an optical module, a manufacturing method thereof, and a display device. The optical module includes: a substrate; a black matrix arranged on the substrate and a plurality of optical lenses spaced apart from each other, wherein an orthogonal projection of a gap between adjacent optical lenses onto the substrate is located within an orthogonal projection of the black matrix onto the substrate, and the black matrix is made of a ferrous metal oxide.

16 Claims, 5 Drawing Sheets

(56) References Cited

FOREIGN PATENT DOCUMENTS

| | | |
|---|---|---|
| CN | 111353480 A | 6/2020 |
| JP | 2005128351 A | 5/2005 |
| JP | 2009294563 A | 12/2009 |
| JP | 2014102268 A | 6/2014 |
| WO | 2020122032 A1 | 6/2020 |

OPTICAL MODULE, MANUFACTURING METHOD, AND DISPLAY DEVICE

CROSS-REFERENCE TO RELATED APPLICATION

This application is the U.S. national phase of PCT application No. PCT/CN2021/089950 filed on Apr. 26, 2021, which is incorporated herein by reference in its entirety.

TECHNICAL FIELD

The present disclosure relates to the field of display technology, in particular to an optical module, a manufacturing method thereof, and a display device.

BACKGROUND

Along with the development of the display technology, the miniaturization of optical elements is increasingly demanded, and an optical lens has emerged. The optical lens generally refers to a lens having an aperture size at a micrometer scale to a millimeter scale, and a quantity of optical lenses are arranged according to a specific rule. As compared with a traditional lens, the optical lens and an array thereof have such advantages as small volume, light weight, and low power consumption. The optical lens is capable of realizing optical characteristics which a traditional optical device does not have, and the device is provided with various special functions based on these optical characteristics. For example, in the field of display, glassless three-dimensional (3D) display is realized through the optical lens.

SUMMARY

In one aspect, the present disclosure provides in some embodiments an optical module, including: a substrate; a black matrix arranged on the substrate and a plurality of optical lenses spaced apart from each other, wherein an orthogonal projection of a gap between adjacent optical lenses onto the substrate is located within an orthogonal projection of the black matrix onto the substrate, and the black matrix is made of a ferrous metal oxide.

In a possible embodiment of the present disclosure, the optical module further includes an etch stop layer arranged on a side of the optical lens away from the substrate and covering the optical lens, and the black matrix is arranged on a side of the etch stop layer away from the substrate.

In a possible embodiment of the present disclosure, the optical module further includes a planarization layer arranged on a side of the black matrix and the optical lens away from the substrate, and having a refractive index less than the optical lens.

In a possible embodiment of the present disclosure, a difference between the refractive index of the planarization layer and the refractive index of the optical lenses is greater than 0.1.

In a possible embodiment of the present disclosure, the planarization layer has a thickness of 5 μm to 30 μm.

In a possible embodiment of the present disclosure, the etch stop layer has a thickness of 10 nm to 100 nm.

In a possible embodiment of the present disclosure, the optical lens has a diameter of 10 μm to 300 μm and a height of 5 μm to 30 μm, and a spacing between adjacent optical lenses is 1.5 μm to 5 μm.

In a possible embodiment of the present disclosure, a thickness of the black matrix is less than 500 nm.

In another aspect, the present disclosure provides in some embodiments a display device including the above-mentioned optical module.

In a possible embodiment of the present disclosure, the display device further includes a display panel arranged opposite to the optical module to form a cell, pixels of the display panel correspond to the optical lenses respectively, and an orthogonal projection of a center point of each pixel onto the substrate coincides with an orthogonal projection of a center point of a corresponding optical lens onto the substrate.

In yet another aspect, the present disclosure provides in some embodiments a method for manufacturing an optical module, including: providing a substrate; forming a plurality of optical lenses spaced apart from each other on the substrate; and forming a black matrix on the substrate using a ferrous metal oxide. An orthogonal projection of a gap between adjacent optical lenses onto the substrate is located within an orthogonal projection of the black matrix onto the substrate.

In a possible embodiment of the present disclosure, subsequent to forming the optical lenses, the method further includes forming an etch stop layer covering the optical lenses. The forming the black matrix includes forming a ferrous metal oxide layer on the etch stop layer through sputtering, and etching the ferrous metal oxide layer to form the black matrix.

In a possible embodiment of the present disclosure, the ferrous metal oxide layer is etched through dry-etching.

In a possible embodiment of the present disclosure, the method further includes forming a planarization layer covering the black matrix and the optical lenses. The planarization layer has a refractive index less than the optical lens.

REFERENCE SIGN LIST 1 substrate
2 slack organic polymer
3 optical lenses
4 planarization layer
5 encapsulation layer
6 display panel
21 black matrix
7 etch stop layer
81 ferrous metal oxide layer
8 black matrix
11, 13, 15 location point
12, 14, 16 light

DETAILED DESCRIPTION

In order to make the objects, the technical solutions and the advantages of the present disclosure more apparent, the present disclosure will be described hereinafter in a clear and complete manner in conjunction with the drawings and embodiments.

In the related art, nano-imprinting is used to form optical lenses, and a light-shielding layer (such as black matrix) is added between the optical lenses to provide the compact-type optical lenses. The light-shielding layer is mainly used to prevent light from directly exiting from a gap between the optical lenses, so as to prevent the occurrence of significant crosstalk.

Figure 1:
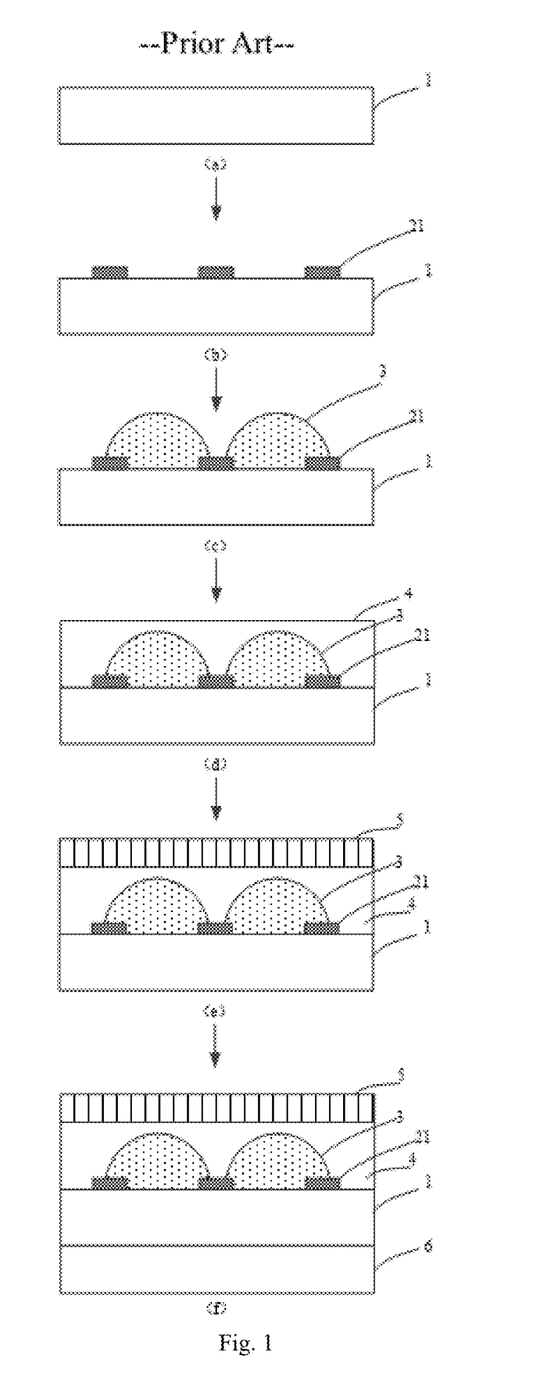
FIG. 1 is a schematic view showing the manufacture of a conventional display device.

FIG. 1 is a schematic view showing the manufacture of a conventional display device. As shown in FIG. 1, the display device is manufactured through: Step a of providing a substrate 1; Step b of forming alignment marks on the substrate 1 and forming a black matrix 21 in accordance with the alignment marks; Step c of forming optical lenses 3 through imprinting on the substrate 1 in accordance with the alignment marks; Step d of forming a planarization layer 4 covering the black matrix 21 and the optical lenses 3; Step e of forming an encapsulation layer 5 covering the planarization layer 4; and Step f of attaching the substrate 1 to the display panel 6 to form the display device.

In the above-mentioned steps, the black matrix 21 and the optical lenses 3 are aligned through an alignment device in a nano-imprinting apparatus, and alignment accuracy is insufficient, e.g., more than a few hundred micrometers, so misalignment may occur between the black matrix 21 and the optical lenses 3, and thereby light output efficiency of an optical module is adversely affected.

Figure 2:
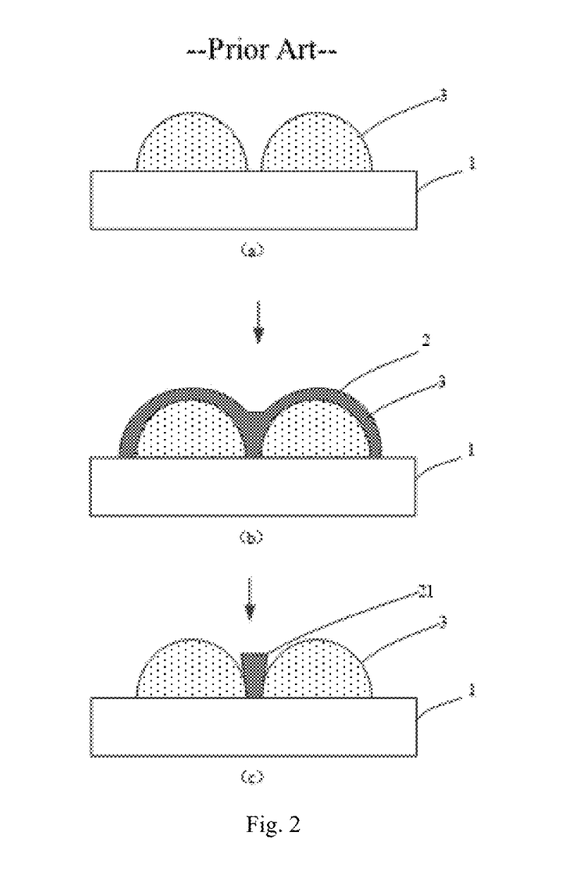
FIG. 2 is a schematic view showing the manufacture of a conventional optical module.

Alternatively, as shown in FIG. 2, the black matrix is made of a black organic polymer, and the optical module is manufactured through: Step a of providing the substrate 1 and forming the optical lenses 3 on the substrate 1; Step b of forming a layer of a black organic polymer 2 covering the optical lenses 3; and Step c of exposing and developing the black organic polymer 2 to form the black matrix 21.

The layer of the black organic polymer 2 generally has a thickness of 1 μm to 2 μm. However, the gap between the optical lenses 3 is very small, generally smaller than 5 μm, so the black organic polymer 2 may level in the gap between the optical lenses 3, thereby an actual thickness of the layer of the black organic polymer 2 at the gap is close to an arch height of the optical lens 3. After the black organic polymer 2 has been patterned subsequently, the black matrix 21 has a relatively large height, close to the arch height of the optical lens 3, and it is of an inverted-trapezoid shape. In this regard, the light output efficiency of the optical lens 3 is significantly adversely affected, and thereby an optical field effect of the optical module as a whole is adversely affected.

An object of the present disclosure is to provide an optical module, a manufacturing method thereof, and a display device, so as to ensure the light output efficiency of the optical module.

The present disclosure provides in some embodiments an optical module, which includes: a substrate; a black matrix arranged on the substrate and a plurality of optical lenses spaced apart from each other, wherein an orthogonal projection of a gap between adjacent optical lenses onto the substrate is located within an orthogonal projection of the black matrix onto the substrate, and the black matrix is made of a ferrous metal oxide.

In the embodiments of the present disclosure, the black matrix is made of the ferrous metal oxide having very low reflectivity and a high optical absorption rate, so it is able to prevent light from passing through the gap between the optical lenses, thereby to prevent the occurrence of crosstalk. In addition, the ferrous metal oxide generally has a small thickness, and it may be dry-etched to form the black matrix. When the black matrix is made of the ferrous metal oxide, it is able to provide the black matrix with a small line width, thereby to improve the light output efficiency of the optical module.

In the embodiments of the present disclosure, an array of photoresist posts is formed through photoetching, and the array of photoresist posts are melt through heat reflux so as to form a spherical optical lens under the effect of surface tension. In this way, it is able to manufacture the optical lens without any alignment device, and prevent the occurrence of misalignment between the black matrix and the optical lens, thereby to ensure the light output efficiency of the optical model.

In the embodiments of the present disclosure, the optical lens is formed subsequent to, or prior to, the formation of the black matrix on the substrate.

Figure 3:
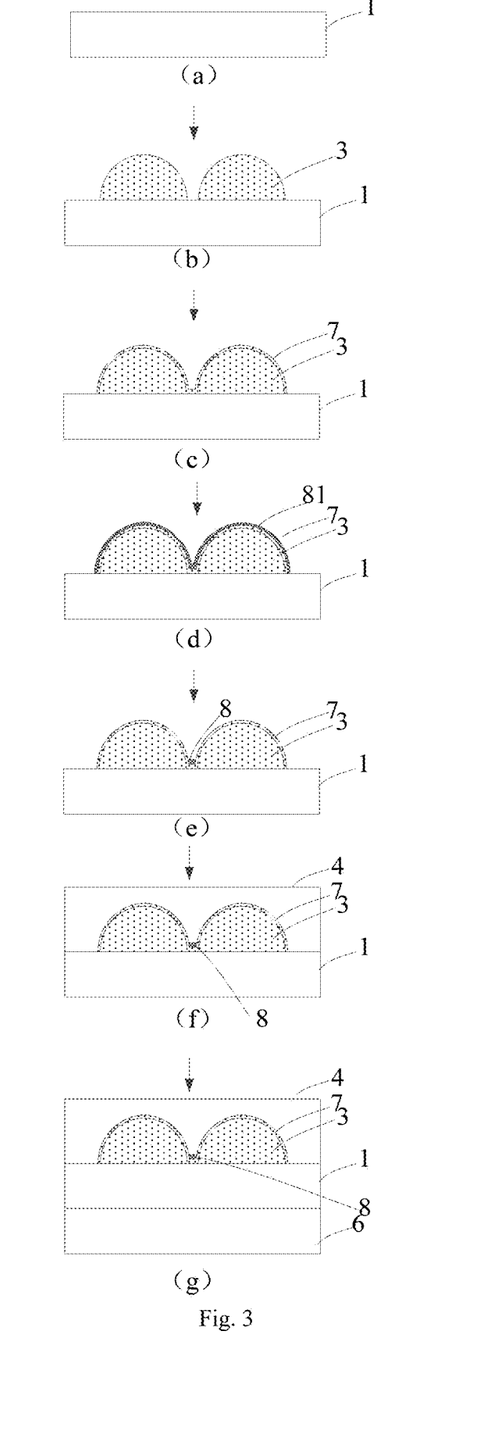
FIG. 3 is a schematic view showing the manufacture of a display device according to one embodiment of the present disclosure.
Figure 6:
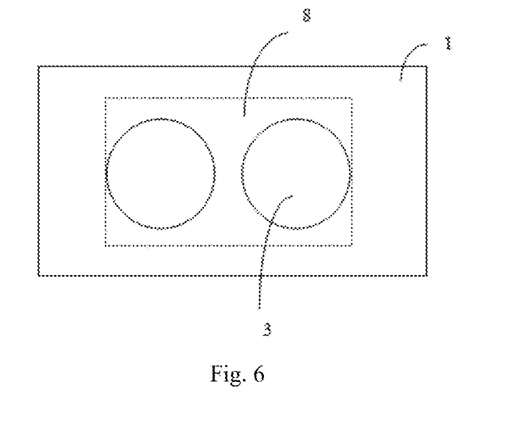
FIG. 6 is a schematic view showing the structure of an optical module according to one embodiment of the present disclosure.

When the optical lens is formed prior to the black matrix, in order to prevent the optical lens from being damaged during the formation of the black matrix through a patterning process, in some embodiments of the present disclosure, as shown in FIGS. 3 and 6, the optical module further includes an etch stop layer 7 arranged on a side of the optical lens 3 away from the substrate 1 and covering the optical lens 3. The black matrix 81 is arranged on a side of the etch stop layer 7 away from the substrate 1. In this way, when the black matrix 81 is formed through a patterning process, the etch stop layer 7 protects the optical lens 3 from being damaged. In order to prevent the light output of the optical lens 3 from being adversely affected, the etch stop layer 7 is made of an inorganic material having high light transmittance, such as SiO or SiN, and it has a film thickness of 10 nm to 100 nm.

In some embodiments of the present disclosure, as shown in FIGS. 3 and 6, the optical module further includes a planarization layer 4 arranged on a side of the black matrix 81 and the optical lens 3 away from the substrate 1. The planarization layer 4 has a refractive index smaller than the optical lens 3.

Figure 4:
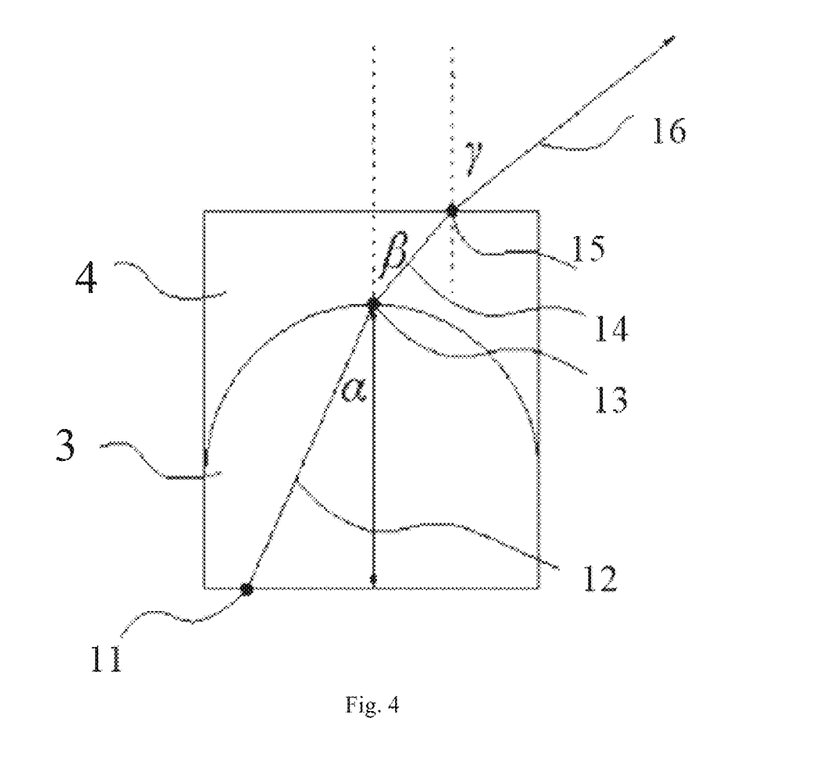
FIGS. 4 and 5 are schematic views showing a principle of glassless 3D display.

As shown in FIG. 4, the planarization layer 4 having the refractive index smaller than the optical lens 3 is arranged on a light-exiting side of the optical lens 3, so it is able to achieve glassless 3D display through an array of optical lenses 3. As shown in FIG. 4, light 12 enters the optical lens 3 at a location point 11, and after reaching a location point 13, there are different refractive indexes at two sides of an interface of a convex surface. Since the refractive index of the planarization layer 4 is smaller than that of the optical lens 3, an incident angle α (the angle between the light 12 and a normal) is smaller than a refraction angle β (the angle between refracted light 14 and the normal).

In addition to the planarization layer 4, air also exists. Since the refractive index of the planarization layer 4 is greater than that of air, identically, an incident angle β (the angle between the light 14 and the normal) is less than a refraction angle γ (the angle between the refracted light 16 and the normal) when the light exits from the planarization layer 4 to air (whose refractive index equals to 1). Hence, the light from the location point 11 propagates to the right as a whole after passing through the optical lens 3.

Figure 5:
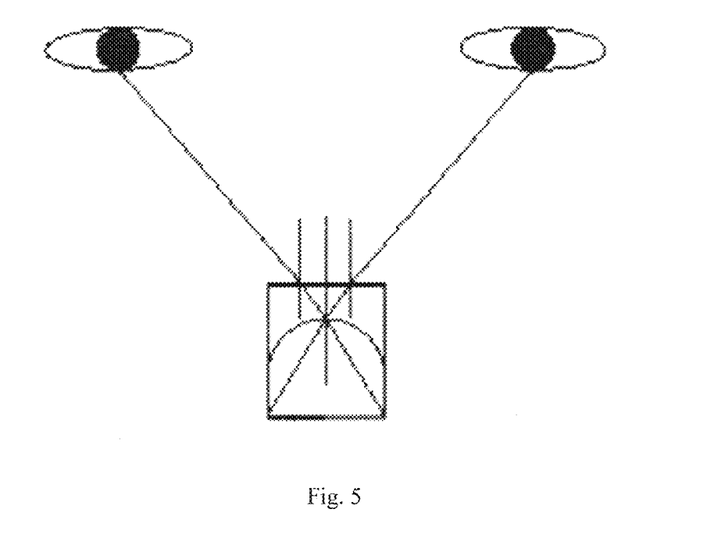

In a word, as shown in FIGS. 4 and 5, after the light from the left passes through the optical lens 3, the light travels to the right and reaches a left eye. Identically, after the light from the right passes through the optical lens 3, the light travels to the left and reaches a right eye. Hence, the left and right eyes may see a left-eye image and a right-eye image respectively, which are combined in the brain to form 3D vision.

In the embodiments of the present disclosure, the optical lens 3 is a hemispherical lens or a cylindrical lens. The hemispherical lens has a circular cross section in a first direction, and a semicircular cross section or a part of a semicircular cross section in a second direction. The cylindrical lens has a square cross section in the first direction, and a semicircular cross section or a part of a semicircular cross section in a third direction. The first direction is parallel to the substrate, the second direction is perpendicular to the substrate, and the third direction is perpendicular to the substrate and perpendicular to an extension direction of the cylindrical lens.

To ensure a glassless 3D display effect, in some embodiments of the present disclosure, a difference between the refractive index of the planarization layer and the refractive index of the optical lens is greater than 0.1. The planarization layer 4 has a thickness of 5 µm to 30 µm and a refractive index of 1.3-1.6. Specifically, the planarization layer 4 is made of an organic resin.

In some embodiments of the present disclosure, a diameter of the optical lens is 10 µm to 300 µm, a height of the optical lens is 5 µm to 30 µm, a spacing between adjacent optical lenses is 1.5 µm to 5 µm, and the refractive index of the optical lens is 1.5-1.8.

In some embodiments of the present disclosure, a thickness of the black matrix is less than 500 nm, which is smaller than a thickness of a conventional black matrix, e.g., 1 µm to −2 µm or more. In this way, it is able to prevent the light output efficiency of the optical lens 3 from being greatly affected by the black matrix.

The present disclosure further provides in some embodiments a display device which includes the above-mentioned optical module.

The display device includes, but not limited to, a radio frequency unit, a network module, an audio output unit, an input unit, a sensor, a display unit, a user input unit, an interface unit, a memory, a processor, and a power source. It should be appreciated that, the display device may not be limited thereto, i.e., it may include more or fewer members, or some members may be combined, or the members may be arranged in different modes. In the embodiments of the present disclosure, the display device may include, but not limited to, display, mobile phone, flat-panel computer, television, wearable electronic device or navigator.

The display device may be any product or member having a display function, such as a television, a display, a digital photo frame, a mobile phone or a tablet computer. The display device further includes a flexible circuit board, a printed circuit board, and a back plate.

In some embodiments of the present disclosure, the display device further includes a display panel arranged opposite to the optical module to form a cell, sub-pixels of the display panel correspond to the optical lenses respectively, and an orthogonal projection of a center point of each sub-pixel onto the substrate coincides with an orthogonal projection of a center point of a corresponding optical lens onto the substrate. In the embodiments of the present disclosure, the optical module is arranged on one side of a display surface of the display panel, and includes a plurality of optical lenses arranged in an array form. Each optical lens correspond to one sub-pixel, and the spacing between adjacent optical lenses is equal to a spacing between adjacent sub-pixels.

There are difference distances between sub-pixels at different positions and optical centers of the corresponding optical lenses. In this way, distances between the sub-pixels at different positions and the optical module are different with respect to a focal length of the optical lens. As compared with a conventional glassless 3D display device where the distances between the sub-pixels at different positions, it is able to greatly increase a depth of a 3D image viewed by a viewer, thereby to improve a stereoscopic effect.

In the conventional glassless 3D display device, the distance g between the sub-pixel at each position and the optical center of the corresponding optical lens is equal. When displaying a 3D image, the light emitted by the sub-pixels is refracted by the optical lens and then focused to form intersection points, and a plane where these intersection points are located is called as a central depth plane a on which an image with a highest resolution is displayed.

In order to increase the image depth without any loss in the image resolution, in the embodiments of the present disclosure, the distances between the sub-pixels at different positions and the optical lenses are different with respect to the focal length of the optical lens. As compared with the conventional glassless 3D display device where the distances between the sub-pixels at different positions, it is able to greatly increase the depth of the 3D image viewed by the viewer, thereby to improve the stereoscopic effect.

In a possible embodiment of the present disclosure, the distances g between at least a part of the sub-pixels and the optical centers of the corresponding optical lenses are smaller than the focal length f of the optical lens, and distances g between at least the other part of the sub-pixels and the optical centers of the corresponding optical lenses is larger than the focal length f of the optical lens.

Based on the above, when the distances g between a part of the sub-pixels and the optical module are less than the focal length f of the optical lens, the 3D image is generated at the rear of the optical module, so as to exhibit an in-screen effect. When the distances g between the other part of the sub-pixels and the optical module are greater than the focal length f of the optical lens, the 3D image is generated in front of the optical module, so as to exhibit an out-screen effect. In this way, it is able to greatly increase the depth of the 3D image viewed by the viewer, thereby to improve the stereoscopic effect.

It should be appreciated that, the distances g between the sub-pixels at different positions and the optical centers of the corresponding optical lenses may also be all smaller than the focal length f of the optical lens or all larger than the focal length f of the optical lens.

In the embodiments of the present disclosure, the display panel is any display element such as Liquid Crystal Display (LCD) panel and Organic Light-Emitting Diode (OLED) display panel. The display panel is designed as a curved surface display panel, and the optical center of each optical lens in the optical module is located on a same plane, so that the distances between the sub-pixels at an edge region and a central region and the optical module are different. In a possible embodiment of the present disclosure, the distances between the sub-pixels at the edge region and the optical centers of the corresponding optical lenses are less than the focal length of the optical lens, and the 3D image is generated at the rear of the optical module, so as to exhibit the in-screen effect. The distances g between the sub-pixels at the central region and the optical module is greater than the focal length f of the optical lens, and the central depth plane where the 3D image is generated is in front of the optical lens, so as to exhibit the out-screen effect. In this way, it is able to greatly increase the depth of the 3D image viewed by the viewer, thereby to improve the stereoscopic effect.

In a possible embodiment of the present disclosure, for the curved surface display panel, the distances between the sub-pixels and the optical centers of the corresponding optical lenses gradually decrease from the central region to the edge region.

Based on the above, since the distances between the sub-pixels and the optical module gradually change, the depth of the image viewed by the viewer gradually changes too, so as to improve a display effect.

It should be appreciated that, in some embodiments of the present disclosure, the display panel is a curved surface display panel, and the optical center of each optical lens is arranged on a same plane. In the other embodiments of the present disclosure, the display panel is a curved surface display panel, and the optical centers of the optical lenses are arranged on a curved surface, as long as the distances between the sub-pixels at different positions and the optical centers of the corresponding optical lenses are different.

The present disclosure further provides in some embodiments a method for manufacturing an optical module, which includes: providing a substrate; forming a plurality of optical lenses spaced apart from each other on the substrate; and forming a black matrix on the substrate using a ferrous metal oxide. An orthogonal projection of a gap between adjacent optical lenses onto the substrate is located within an orthogonal projection of the black matrix onto the substrate.

In the embodiments of the present disclosure, the black matrix is made of the ferrous metal oxide having very low reflectivity and a high optical absorption rate, so it is able to prevent light from passing through the gap between the optical lenses, thereby to prevent the occurrence of crosstalk. In addition, the ferrous metal oxide generally has a small thickness, and it may be dry-etched to form the black matrix. When the black matrix is made of the ferrous metal oxide, it is able to provide the black matrix with a small line width, thereby to improve the light output efficiency of the optical module.

In the embodiments of the present disclosure, the optical lens is formed subsequent to, or prior to, the formation of the black matrix on the substrate.

In the embodiments of the present disclosure, an array of photoresist posts is formed through photoetching, and the array of photoresist posts are melt through heat reflux so as to form a spherical optical lens under the effect of surface tension. In this way, it is able to manufacture the optical lens without any alignment device, and prevent the occurrence of misalignment between the black matrix and the optical lens, thereby to ensure the light output efficiency of the optical model.

When the optical lens is formed prior to the black matrix, in order to prevent the optical lens from being damaged during the formation of the black matrix through a patterning process, in some embodiments of the present disclosure, the method further includes forming an etch stop layer covering the optical lenses. The forming the black matrix includes forming a ferrous metal oxide layer on the etch stop layer through sputtering, and etching the ferrous metal oxide layer to form the black matrix.

In some embodiments of the present disclosure, the ferrous metal oxide is dry-etched, so as to reduce a CD bias as well as the line width of the black matrix, thereby to improve the light efficiency of the entire device.

In some embodiments of the present disclosure, the method further includes forming a planarization layer covering the black matrix and the optical lenses. The planarization layer has a refractive index less than the optical lens.

As shown in FIG. 3, in a specific embodiment of the present disclosure, the method includes the following steps.

Step a: providing the substrate 1.

The substrate 1 is a rigid substrate such as a quartz substrate or a glass substrate, or a flexible substrate.

Step b: forming the optical lenses 3 on the substrate 1.

The optical lens is formed through imprinting or heat reflux. An array of photoresist posts is formed on the substrate 1 through photoetching, and the array of photoresist posts are melt through heat reflux so as to form a spherical optical lens under the effect of surface tension.

The optical lens 3 has a diameter of 10 μm to 300 μm and a height of 5 μm to 30 μm, a gap between adjacent optical lenses 3 is 1.5 μm to 5 μm, and a refractive index of the optical lens is 1.5-1.8.

Step c: forming the etch stop layer 7 covering the optical lenses 3.

In order to prevent the light output of the optical lens 3 from being adversely affected, the etch stop layer 7 is made of an inorganic material having high light transmittance, such as SiO or SiN, and it has a film thickness of 10 nm to 100 nm.

Specifically, an inorganic film layer, e.g., a SiO layer, is deposited through Plasma Enhanced Chemical Vapor Deposition (PECVD) as the etch stop layer.

Step d: forming a ferrous metal oxide layer 81.

The ferrous metal oxide layer 81 is made of molybdenum oxide MoOx through sputtering. The MoOx film layer has very low reflectivity, a high optical absorption, and a thickness of 100 nm to 500 nm.

Step e: patterning the ferrous metal oxide layer 81 to form the black matrix 8.

The ferrous metal oxide layer 81 is patterned through photoetching. To be specific, the ferrous metal oxide layer 81 is wet-etched or dry-etched. When it is dry-etched, it is able to reduce a CD bias as well as the line width of the black matrix 8, thereby to improve the light efficiency of the entire device.

Step f: forming the planarization layer 4 covering the optical lenses 3.

The planarization layer 4 has a thickness of 5 μm to 30 μm and a refractive index of 1.3-1.6, and specifically it is made of an organic resin.

As shown in FIG. 4, the planarization layer 4 having the refractive index smaller than the optical lens 3 is arranged on a light-exiting side of the optical lens 3, so it is able to achieve glassless 3D display through an array of optical lenses 3. As shown in FIG. 4, light 12 enters the optical lens 3 at a location point 11, and after reaching a location point 13, there are different refractive indexes at two sides of an interface of a convex surface. Since the refractive index of the planarization layer 4 is smaller than that of the optical lens 3, an incident angle α (the angle between the light 12 and a normal) is smaller than a refraction angle β (the angle between refracted light 14 and the normal).

In addition to the planarization layer 4, air also exists. Since the refractive index of the planarization layer 4 is greater than that of air, identically, an incident angle β (the angle between the light 14 and the normal) is less than a refraction angle γ (the angle between the refracted light 16 and the normal) when the light exits from the planarization layer 4 to air (whose refractive index equals to 1). Hence, the light from the location point 11 propagates to the right as a whole after passing through the optical lens 3.

In a word, as shown in FIGS. 4 and 5, after the light from the left passes through the optical lens 3, the light travels to the right and reaches a left eye. Identically, after the light from the right passes through the optical lens 3, the light travels to the left and reaches a right eye. Hence, the left and right eyes may see a left-eye image and a right-eye image respectively, which are combined in the brain to form 3D vision.

To ensure a glassless 3D display effect, in some embodiments of the present disclosure, a difference between the refractive index of the planarization layer and the refractive index of the optical lens is greater than 0.1.

Step g: attaching the substrate 1 to the display panel 6.

In the above Steps a-g, the optical lens is formed prior to the black matrix. Of course, a specific order of the steps will not be particularly defined herein, and in some embodiments of the present disclosure, the black matrix is formed prior to the optical lens.

It should be appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An optical module, comprising:
   a substrate; and
   a black matrix arranged on the substrate and a plurality of optical lenses spaced apart from each other,
   wherein an orthogonal projection of a gap between adjacent optical lenses onto the substrate is located within an orthogonal projection of the black matrix onto the substrate, and the black matrix is made of molybdenum oxide;
   the optical module further comprises an etch stop layer arranged on a side of the optical lens away from the substrate and covering the optical lens, wherein the black matrix is arranged on a side of the etch stop layer away from the substrate.

2. The optical module according to claim 1, further comprising a planarization layer arranged on a side of the black matrix and the optical lens away from the substrate, and having a refractive index less than the optical lens.

3. The optical module according to claim 2, wherein a difference between the refractive index of the planarization layer and the refractive index of the optical lenses is greater than 0.1.

4. The optical module according to claim 2, wherein the planarization layer has a thickness of 5 μm to 30 μm.

5. The optical module according to claim 1, wherein the etch stop layer has a thickness of 10 nm to 100 nm.

6. The optical module according to claim 1, wherein the optical lens has a diameter of 10 μm to 300 μm and a height of 5 μm to 30 μm, and a spacing between adjacent optical lenses is 1.5 μm to 5 μm.

7. The optical module according to claim 1, wherein a thickness of the black matrix is less than 500 nm.

8. A display device comprising the optical module according to claim 1.

9. The display device according to claim 8, further comprising a display panel arranged opposite to the optical module to form a cell, wherein pixels of the display panel correspond to the optical lenses respectively, and an orthogonal projection of a center point of each pixel onto the substrate coincides with an orthogonal projection of a center point of a corresponding optical lens onto the substrate.

10. The optical module according to claim 2, wherein the optical lens has a diameter of 10 μm to 300 μm and a height of 5 μm to 30 μm, and a spacing between adjacent optical lenses is 1.5 μm to 5 μm.

11. The optical module according to claim 3, wherein the optical lens has a diameter of 10 μm to 300 μm and a height of 5 μm to 30 μm, and a spacing between adjacent optical lenses is 1.5 μm to 5 μm.

12. The optical module according to claim 4, wherein the optical lens has a diameter of 10 μm to 300 μm and a height of 5 μm to 30 μm, and a spacing between adjacent optical lenses is 1.5 μm to 5 μm.

13. The optical module according to claim 5, wherein the optical lens has a diameter of 10 μm to 300 μm and a height of 5 μm to 30 μm, and a spacing between adjacent optical lenses is 1.5 μm to 5 μm.

14. A method for manufacturing an optical module, comprising:
   providing a substrate;
   forming a plurality of optical lenses spaced apart from each other on the substrate; and
   forming a black matrix on the substrate using molybdenum oxide,
   wherein an orthogonal projection of a gap between adjacent optical lenses onto the substrate is located within an orthogonal projection of the black matrix onto the substrate;
   wherein subsequent to forming the optical lenses, the method further comprises: forming an etch stop layer covering the optical lenses, wherein the forming the black matrix includes forming a molybdenum oxide layer on the etch stop layer through sputtering, and etching the molybdenum oxide layer to form the black matrix.

15. The method according to claim 14, wherein the molybdenum oxide layer is etched through dry-etching.

16. The method according to claim 14, further comprising forming a planarization layer covering the black matrix and the optical lenses, wherein the planarization layer has a refractive index less than the optical lens.

* * * * *